(12) United States Patent
Jiang et al.

(10) Patent No.: US 7,475,124 B2
(45) Date of Patent: Jan. 6, 2009

(54) NETWORK BLOCK SERVICES FOR CLIENT ACCESS OF NETWORK-ATTACHED DATA STORAGE IN AN IP NETWORK

(75) Inventors: Xiaoye Jiang, Shrewsbury, MA (US); Dinesh Venkatesh, Westford, MA (US); Mark K. Ku, Braintree, MA (US); Xiangping Chen, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1199 days.

(21) Appl. No.: 10/255,148

(22) Filed: Sep. 25, 2002

(65) Prior Publication Data

US 2004/0059822 A1 Mar. 25, 2004

(51) Int. Cl.
*G06F 15/16* (2006.01)
*G06F 15/173* (2006.01)

(52) U.S. Cl. ............... 709/219; 709/203; 709/217; 709/223; 709/224

(58) Field of Classification Search ............ 709/230, 709/215, 203, 217, 219, 223, 224
See application file for complete search history.

(56) References Cited

U.S. PATENT DOCUMENTS

| | | | |
|---|---|---|---|
| 4,630,201 A | 12/1986 | White | |
| 5,311,596 A | 5/1994 | Scott et al. | |
| 5,742,792 A | 4/1998 | Yanai et al. | 395/489 |
| 5,745,727 A | 4/1998 | Chau et al. | |
| 5,796,840 A | 8/1998 | Davis | |
| 5,948,062 A | 9/1999 | Tzelnic et al. | 709/219 |
| 6,044,468 A | 3/2000 | Osmond | |
| 6,073,237 A | 6/2000 | Ellison | |
| 6,111,953 A | 8/2000 | Walker et al. | |
| 6,185,695 B1 * | 2/2001 | Murphy et al. | 714/4 |
| 6,353,878 B1 | 3/2002 | Dunham | 711/162 |
| 6,493,825 B1 | 12/2002 | Blumenau et al. | |
| 6,601,101 B1 * | 7/2003 | Lee et al. | 709/227 |
| 6,606,690 B2 * | 8/2003 | Padovano | 709/220 |

(Continued)

OTHER PUBLICATIONS

Li, Qiang, Box-to-Box Disk Mirroring, Oct. 8-10, 2001, IEEE International Symposium on Network Computing and Applications. NCA 2001, CAmbridge, MA.*

(Continued)

*Primary Examiner*—John Follansbee
*Assistant Examiner*—Hassan Phillips
(74) *Attorney, Agent, or Firm*—Richard C. Auchterlionie; Novak Druce & Quigg, LLP (57) ABSTRACT

The SCSI and iSCSI layers over the TCP/IP layers of the protocol stack in an IP network client and in an IP network-attached storage server are replaced with a thin network block services layer. The network block services layer 71 implements a network block services protocol having a very reduced set of commands transmitted between the client and the storage server. The network block services protocol is used in a configuration process in which logical volumes of the network-attached storage are exported to the client and become local pseudo-disk instances. The client's operating system and application programs access the local pseudo-disk instances with what appears to be a standard device driver for a local disk device. The device driver maintains a TCP connection to each open device, and responds to connection failure by re-connecting with an alternative server IP port.

7 Claims, 9 Drawing Sheets

U.S. PATENT DOCUMENTS

| | | | |
|---|---|---|---|
| 6,651,101 B1* | 11/2003 | Gai et al. | 709/224 |
| 6,665,714 B1* | 12/2003 | Blumenau et al. | 709/222 |
| 6,934,875 B2* | 8/2005 | Kashyap | 714/4 |
| 7,051,182 B2 | 5/2006 | Blumenau et al. | |
| 7,093,021 B2 | 8/2006 | Blumenau et al. | |
| 2002/0049825 A1* | 4/2002 | Jewett et al. | 709/215 |
| 2002/0133539 A1* | 9/2002 | Monday | 709/220 |
| 2003/0135782 A1* | 7/2003 | Matsunami et al. | 714/5 |
| 2004/0233910 A1* | 11/2004 | Chen et al. | 370/395.5 |
| 2005/0033748 A1* | 2/2005 | Kazar et al. | 707/10 |

OTHER PUBLICATIONS

SCSI-3 Block Commands (SBC), ANSI NCITS.306-1998, American National Standards Insitute, 11 West 42nd Street, New York, New York 10036, Jan. 7, 1998, pp. 1-127.

Reduced Block Commands (RBC), ANSI NCITS.330-2000, American National Standards Institute, 11 West 42nd Street, New York, New York 10036, Apr. 25, 2000, pp. 1-35.

Sean Derrington, "NAS and SAN Storage: Separate but Equal?—Part 2," File 838, Server Infrastructure Strategies, Meta Group Inc., 208 Harbor Drive, Stamford, CT 06912-0061, Jun. 12, 2000, 4 pages.

"Writing Device Drivers," Part No. 805-7378-10, Sun Microsystems, Inc., 801 San Antonio Road, Palo Alto, CA 94303-4900, http://soldc.sun.com/articles/writingdev.html, Feb. 2000, pp. 1-55, 141-184.

RFC 791, Internet Protocol, DARPA Internet Program Protocol Specification, Information Sciences Institute, University of Southern California, Marina del Rey, California, Sep. 1981, http://rfc.sunsite.dk/rfc/rfc791.html, 51 pages.

RFC 793, Transmission Control Protocol, DARPA Internet Program Protocol Specification, Information Sciences Institute, University of Southern California, Marina del Rey, California, Sep. 1981, http://rfc.sunsite.dk/rfc/rfc793.html, 91 pages.

Charles M. Kozierok, "Overview of SCSI-3 Standards," The PC Guide, http://www.pcguide.com/ref/hdd/if/scsi/std/scsi3Over-c.html, Apr. 17, 2001, 3 pages.

EMC Celerra SE5 File Server, EMC Corporation, Hopkinton, Mass. 01748-9103, 2002, 2 pages.

XML for the Absolute Beginner—A Short Tutorial, Perfect XML.com, http://www.perfectxml.com/articles/xml/begin.asp, 2002, 6 pages.

Menezes et al., Handbook of Applied Cryptograpy, CRC Press, Oct. 17, 1996, pp. 387, 400-402.

Network Working Group, G. Walters, Editor, "User-based Security Model for SNMPv2," RFC 1910, Feb. 1996, 40 pages, The Internet Society, Reston, VA.

Gibson et al., "A Case for Network-Attached Secure Disks," CMU-CS-96-142, Sep. 26, 1996, School of Computer Science, Camegie Mellon University, Pittsburg, Pennsylvania, 19 pages.

Gibson et al., "File Server Scaling with Network-Attached Secure Disks," Proceedings of the ACM International Conference on Measurement and Modeling of Computer Systems (Sigmetrics '97), Seattle, Washington, Jun. 15-18, 1997, 13 pages.

Gibson et al., "Filesystems for Network-Attached Secure Disks," CMU-CS-97-118, Jul. 1997, School of Computer Science, Carnegie Mellon University, Pittsburg, Pennsylvania, 18 pages.

Gobioff, et al, "Security for Network Attached Storage Devices," CMU-CS-97-185, Oct. 23, 1997, School of Computer Science, Carnegie Mellon University, Pittsburgh, Pennsylvania, 18 pages.

\* cited by examiner

| | | | | | | | |
|---|---|---|---|---|---|---|---|
| Opcode | PduLen | Pid | Status | Reserved 1 | VolID | Offset | DataLen |

CLIENT OPCODES

| READ | READS A SPECIFIED LENGTH OF DATA FROM A SPECIFIED VOLUME BEGINNING AT A SPECIFIED OFFSET |
|---|---|
| WRITE | WRITES A SPECIFIED LENGTH OF DATA TO SPECIFIED VOLUME BEGINNING AT A SPECIFIED OFFSET |
| INFO | REQUESTS THE VOLUMES FOR A SPECIFIED KEY, OR REQUESTS THE READ CAPACITY FOR A SPECIFIED VOLUME ID |
| NO-OP | SENDS A PACKET TO A SERVER TO GET A RETURN PACKET TO TEST OR KEEP ALIVE THE TCP CONNECTION |

FIG. 8

SERVER OPCODES

| READ RETURN | RETURNS THE REQUESTED DATA |
|---|---|
| WRITE RETURN | RETURNS A CONFIRMATION OF THE WRITE OPERATION |
| INFO RETURN | RETURNS THE REQUESTED INFORMATION |
| NO-OP RETURN | RETURNS A NO-OP PACKET |

NETWORK BLOCK SERVICES FOR CLIENT ACCESS OF NETWORK-ATTACHED DATA STORAGE IN AN IP NETWORK

A portion of the disclosure of this patent document contains computer code listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

BACKGROUND OF THE INVENTION

1. Field of the Invention

The present invention relates generally to network-attached data storage, and more particularly, to client access of network-attached data storage in an Internet Protocol (IP) network.

2. Description of Related Art

Local disk drives are typically coupled to a host computer over a parallel interface, such as a Small Computer System Interface (SCSI). A SCSI port provides a data bandwidth of up to 80 megabytes per second, and multiple disk drives can be attached to a single SCSI port. A SCSI port can also be used to couple a storage system to a host. The storage system, for example, may use a redundant array of inexpensive disks (RAID).

Various SCSI standards are published by the International Committee for Information Technology (NCITS), Information Technology Industry Council, 1250 Eye Street NW, Suite 200, Washington, D.C. 20005. For example, there is a standard set of SCSI-3 block commands for transferring data in blocks from random-access devices such as hard disks. The full set of block commands are set out in the standard NCITS.306-1998, and a reduced set of block commands are set out in the standard NCITS.330-2000.

Storage systems have also been developed that provide continuous storage availability over network-attached storage. This has been done effectively by clustering front-end processors to back-end RAID storage, and having the storage addressable by both file and block applications. Block applications, for example, may send SCSI-type block commands to the network-attached storage. In many situations, it is desired to send SCSI-type block commands over an Internet Protocol (IP) network, such as a 10-base-T IP network, a Fibre-Channel IP network, or the Internet. For example, an IP-network solution may have a lower infrastructure cost for a given level of performance, or it may be desired to add reliable backup storage to an existing IP network. Unfortunately, for block applications, the IP network has been a bottleneck in the data path.

One proposed way of addressing the problem of providing block services over an IP network is to traverse the IP stack and attempt to convert file formats to block formats, and then block formats back to file formats, in order to attach storage directly to the IP network. However, this has been seen as removing the simplicity of the network-attached solution. Therefore, IT organizations have been advised to examine network-attached solutions for file services and channel-attached solutions (e.g., Ultra SCSI, Fibre Channel) for block services, while understanding the benefits and limitations of each storage architecture. See Sean Derrington, "NAS and SAN Storage: Separate but Equal?—Part 2," File 838, Server Infrastructure Strategies, Meta Group Inc., 208 Harbor Drive, Stamford, Conn. 06912-0061, Jun. 12, 2000.

SUMMARY OF THE INVENTION

In accordance with a first aspect, the invention provides a data processing system including a client, a storage server, and an Internet Protocol (IP) network linking the client to the storage server for client access to storage in the storage server. The storage includes storage units allocated to the client. The storage server also contains an identification of the storage units allocated to the client. The client and the storage server each are programmed with a protocol stack. Each protocol stack includes a network block services layer over an IP layer. The network block services layer encodes and decodes IP packets transmitted over the IP network between the client and the server in accordance with a network block services protocol. The IP packets transmitted over the IP network between the client and the server in accordance with the network block services protocol include IP packets for requesting the identification of the storage units allocated to the client, IP packets for reading data from the storage units allocated to the client, and IP packets for writing data to the storage units allocated to the client. The client is programmed for configuring the identified storage units allocated to the client into pseudo-disk instances after obtaining from the storage server the identification of the storage units allocated to the client by invoking the network block services layer to request from the storage server the identification of the storage units allocated to the client. The client is further programmed with a block interface for enabling an operating system or application program of the client to access the pseudo-disk instances by invoking the network block services layer to read data from the storage units allocated to the client and for writing data to the storage units allocated to the client.

In accordance with another aspect, the invention provides a client for accessing a storage server in an Internet Protocol (IP) network. The storage server contains storage units allocated to the client. The storage server also contains an identification of the storage units allocated to the client. The client is programmed for encoding and decoding IP packets transmitted over the IP network between the client and the server in accordance with a network block services protocol. The IP packets transmitted over the IP network between the client and the server in accordance with the network block services protocol include IP packets for requesting identification of the storage units allocated to the client, IP packets for reading data from the storage units allocated to the client, and IP packets for writing data to the storage units allocated to the client. The client is programmed for using the network block services protocol for obtaining the identification of the storage units allocated to the client. The client is also programmed for configuring the identified storage units allocated to the client into local pseudo-disk instances. The client maintains a list of storage server IP addresses for each of the local pseudo-disk instances. The client is further programmed with a device driver for accessing each local pseudo-disk instance by establishing and maintaining a Transmission Control Protocol (TCP) connection to at least one storage server IP address in the list of storage server IP addresses for the local pseudo-disk instance.

In accordance with yet another aspect, the invention provides a storage server including storage for use in an Internet Protocol (IP) network linking clients to the storage server for client access to the storage. The storage includes a respective group of storage units allocated to each client. The storage contains an identification of the storage units allocated to each client. The storage server is programmed to encode and decode IP packets transmitted over the IP network between each client and the server in accordance with a network block services protocol. The IP packets transmitted over the IP network between each client and the server in accordance with the network block services protocol include IP packets for requesting identification of the storage units allocated to the client, IP packets for reading data from the storage units allocated to the client, and IP packets for writing data to the storage units allocated to the client.

In accordance with still another aspect, the invention provides a client driver for use in a client having at least one IP port for accessing network-attached storage allocated to the client in an Internet Protocol (IP) network. The client driver includes configuration file means for storing configuration information in local storage of the client. The configuration information defines pseudo-disk instances configured from the network-attached storage allocated to the client, and the configuration information identifies server IP addresses at which the network-attached storage of the pseudo-disk instances may be accessed. The client driver also includes network block services means for encoding and decoding IP packets transmitted over the IP network between the client and the network-attached storage in accordance with a network block services protocol. The IP packets transmitted over the IP network between the client and the network-attached storage in accordance with the network block services protocol include IP packets for requesting identification of the network-attached storage allocated to the client, IP packets for reading data from network-attached storage allocated to the client, and IP packets for writing data to the network-attached storage allocated to the client. The client driver further includes configuration and fail-over means coupled to the network block services means and the IP port and accessing the configuration file for using the network block services means for discovering the network-attached storage allocated to the client and configuring the pseudo disk instances from the network-attached storage allocated to the client, and for establishing and maintaining a Transmission Control Protocol (TCP) connection for an open pseudo-disk instance to at least one server IP address at which network-attached storage of the open pseudo-disk instance may be accessed. The client driver further includes block device driver means coupled to the network block services means and the configuration and fail-over means for presenting a disk driver interface to client programs for access to the pseudo-disk instances.

In accordance with a final aspect, the invention provides a method of operating a client to access a storage server in an Internet Protocol (IP) network. The storage server contains storage units allocated to the client. The storage server also contains an identification of the storage units allocated to the client. The method includes the client encoding and decoding IP packets transmitted over the IP network between the client and the server in accordance with a network block services protocol. The IP packets transmitted over the IP network between the client and the server in accordance with the network block services protocol include IP packets for requesting identification of the storage units allocated to the client, IP packets for reading data from the storage units allocated to the client, and IP packets for writing data to the storage units allocated to the client. The client obtains from the storage server the identification of the storage units allocated to the client. The client configures the identified storage units allocated to the client into local pseudo-disk instances, and maintains a list of server IP addresses for each of the local pseudo-disk instances. The client operates a device driver that accesses each local pseudo-disk instance by establishing and maintaining a Transmission Control Protocol (TCP) connection to at least one server IP address in the list of IP addresses for the local pseudo-disk instance.

BRIEF DESCRIPTION OF THE DRAWINGS

Additional features and advantages of the invention will be described below with reference to the drawings, in which.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBIDIMENTS

Figure 1:
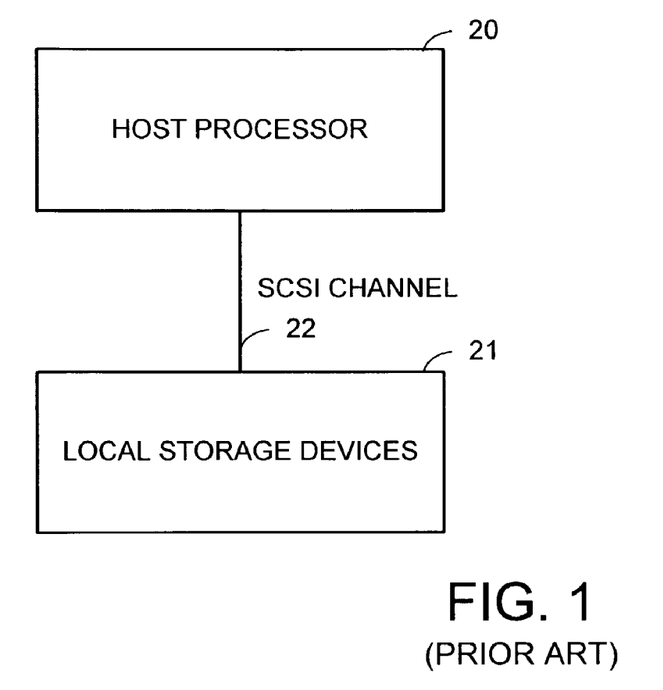
FIG. 1 shows a conventional connection between a host processor and local storage devices.
Figure 2:
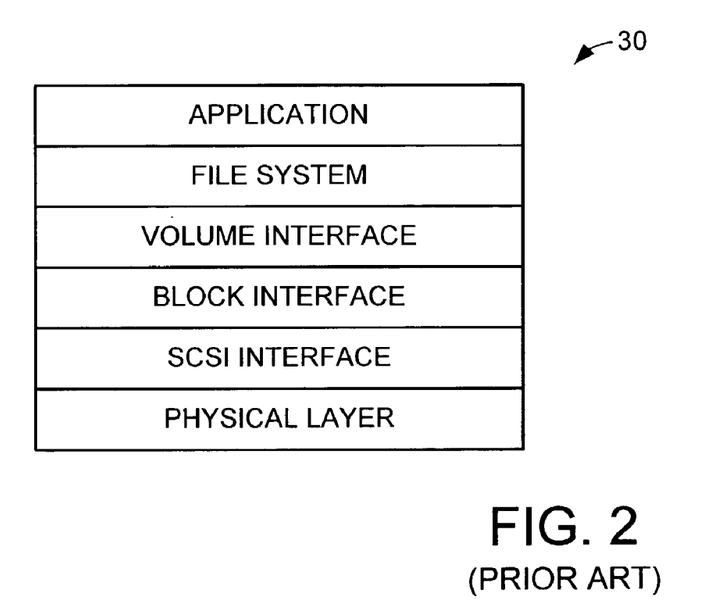
FIG. 2 shows a protocol stack for the host processor in FIG. 1.

As shown in FIG. 1, a host processor accesses local storage devices 21 through an SCSI channel 22. As further shown in FIG. 2, the host processor 20 is programmed with a protocol stack 30. The protocol stack 30 has a number of program layers including an application, a file system, a volume interface, a block interface, an SCSI interface, and a physical layer.

Figure 3:
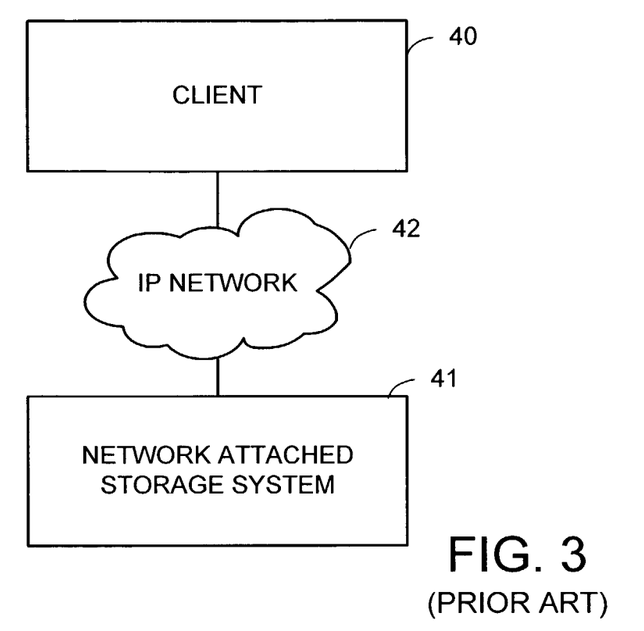
FIG. 3 shows a conventional Internet Protocol (IP) network including a client and a network-attached storage system.

FIG. 3 shows a conventional data processing network in which a client 40 accesses a network-attached storage system 41 through an IP network 42. In this case, the client 40 is programmed with a protocol stack 50 shown in FIG. 4. The protocol stack 50 includes an application, a file system, a volume interface, a block interface, an SCSI interface, an iSCSI interface, a TCP layer, an IP layer, and a physical layer.

In the data processing network of FIG. 3, the IP network has been a bottleneck in the data path from the client 40 to the network-attached storage system 41. What is desired is a way of removing this bottleneck without introducing complexity from the viewpoint of the client's operating system or application programs.

Figure 5:
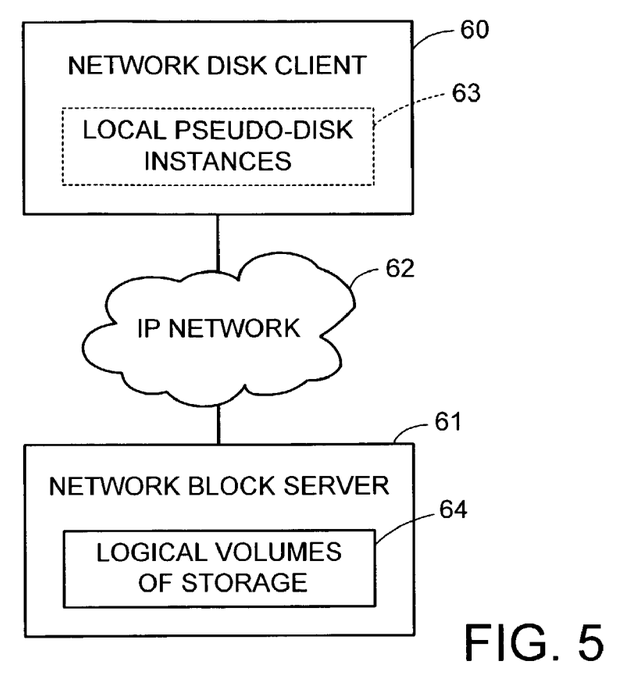
FIG. 5 shows an IP network including a network disk client and a network block server in accordance with one aspect of the present invention.

FIG. 5 shows a data processing system in accordance with one aspect of the present invention. In FIG. 5, a network disk client 60 is interfaced to a network block server 61 through an IP network 62. The network disk client 60 appears to access local pseudo-disk instances 63, which are logical volumes of storage 64 exported from the network block server 61 to the network disk client 60.

Figure 6:
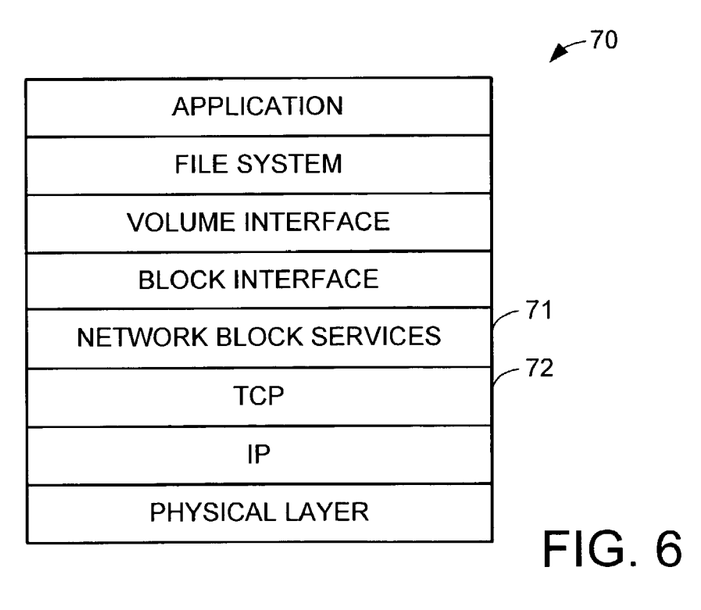
FIG. 6 shows a protocol stack for the network disk client in the IP network of FIG. 5.

The network disk client 60 of FIG. 5 is programmed with a protocol stack 70 shown in FIG. 6. The protocol stack 70 includes an application, a file system, a volume interface, a block interface, a network block services layer 71, a TCP layer 72, an IP layer, and a physical layer. In comparison to the protocol stack 50 of FIG. 4, the protocol stack 70 of FIG. 6 has replaced the SCSI interface and the iSCSI interface with a thin network block services layer 71 over the TCP layer 72.

The network storage solution offered by the system of FIG. 5 and the protocol stack of FIG. 6 is a way of reducing client data processing requirements and IP network bandwidth that would be otherwise required by SCSI protocol layers and SCSI control commands transmitted over IP network. The network block services layer 71 implements a network block services protocol that is used in an initial configuration process in which logical volumes of the network-attached storage are exported to the client and become local pseudo-disk instances. The local pseudo-disk instances appear to the client's operating system and application programs as if they were disk devices local to the client. For example, as further described below, the client's operating system and application programs call what appears to be a standard device driver for a local device. In this fashion, simplicity is maintained from the viewpoint of the client's operating system and application programs. Moreover, the initial configuration process reduces overhead upon the read-write access of the logical volumes in the network-attached storage.

Figure 4:
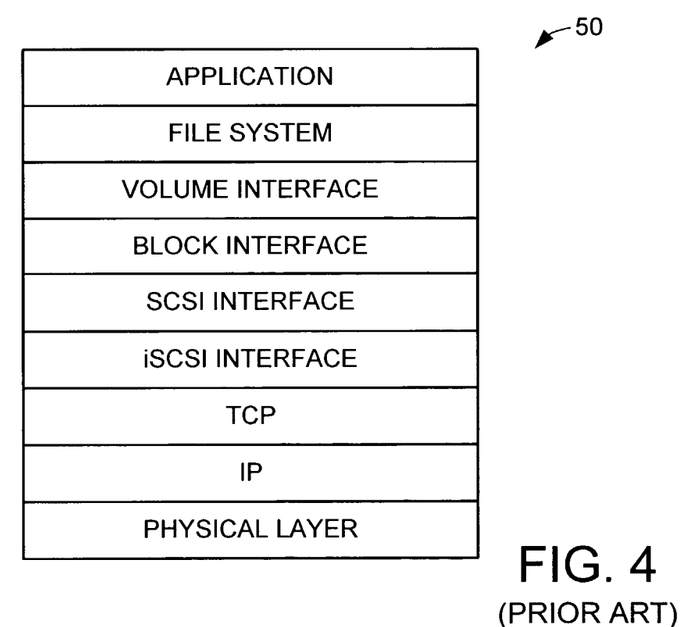
FIG. 4 shows a protocol stack for the client in the IP network of FIG. 3.

In addition, network block services protocol has a very small number of commands, so that the programming in the network block services layer 71 for decoding and executing the commands is very condensed in comparison to the SCSI interface and iSCSI interface of FIG. 4. This condensed programming therefore can be optimized to interface with the TCP layer (72 in FIG. 6) in a more efficient manner than the SCSI interface and iSCSI interface of FIG. 4.

The network block services protocol also provides for enhanced data availability and enhanced bandwidth to the network-attached storage. Each local pseudo-disk device can be mapped to multiple server ports for increased bandwidth and for TCP connection fail over purposes. Upon failure of one of the server connections, the client driver switches to an alternative server IP address to ensure continuance of the input-output operations. Moreover, each pseudo-disk device can be mapped to multiple storage systems attached to the client via independent network links for enhanced storage reliability in the event of a failure of an entire storage system. Each of the multiple network-attached storage systems can contain a respective read-only copy or a remotely mirrored and synchronized read-write copy of a logical volume for the pseudo-disk device.

Figure 7:
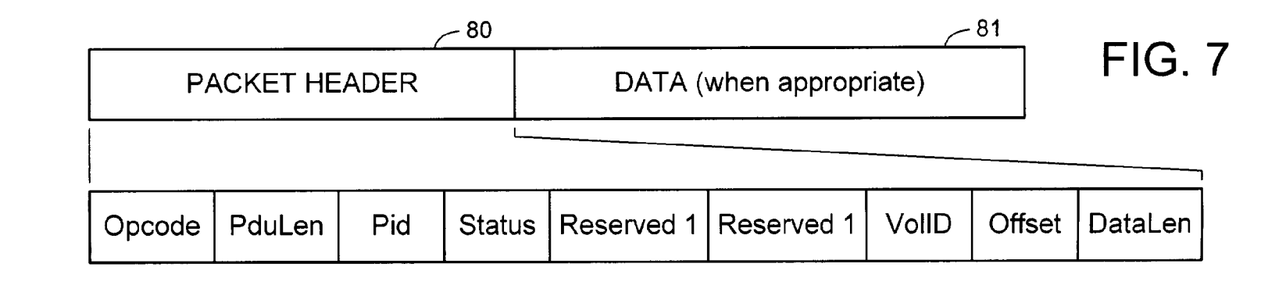
FIG. 7 shows a data packet transmitted through the IP network of FIG. 5 in accordance with a network block services protocol.

FIG. 7 shows an IP data packet encoded by the network block services layer (71 in FIG. 6). The data packet includes a packet header 80 and, when appropriate, data 81 appended to the packet header. The packet header, for example, has the following format:

```
Struct PktHdr {
    unsigned long         OpCode;
    unsigned long         PduLen;
    unsigned long long    Pid;
    RtnStat_t             Status;
    unsigned long         Reserve1 ;
    unsigned long         Reserve2 ;
    Char                  VolID[MAX_VNAME_LEN] ;
    unsigned long long    Offset ;
    unsigned long         DataLen;
};
```

These fields include an opcode field (OpCode), a packet data unit length field (PduLen), a packet identifier field (Pid), a status field (Status), two reserved fields (Reserve1 and Reserve2), a volume ID field (VolID), an offset field (Offset), and a data length field (DataLen). The OpCode, PduLen, Status, Offset and DataLen fields in the packet header are all represented as network byte order (i.e. big endian). All bits not defined should be set to zero, and all reserve fields should be set to zero as well.

Figure 8:
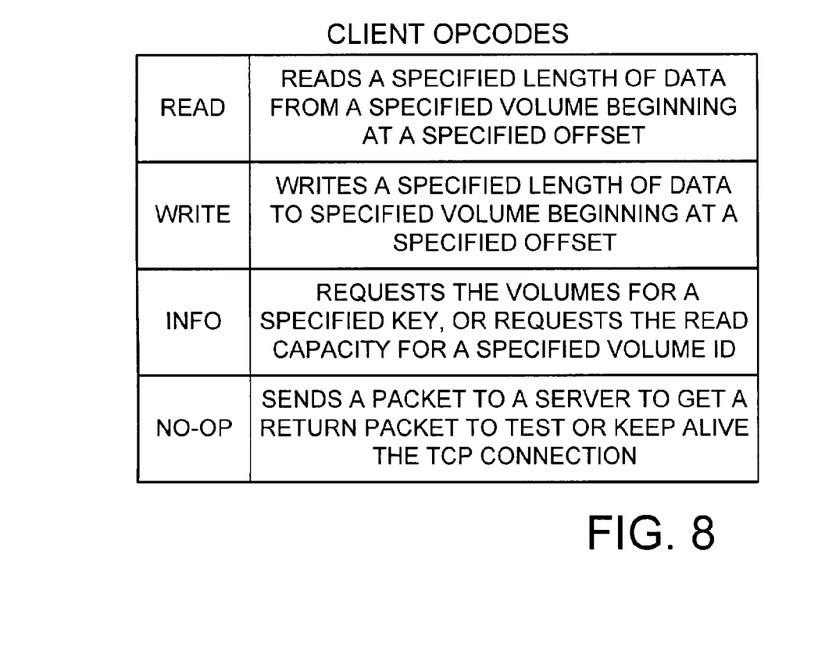
FIG. 8 is a table showing client opcodes transmitted in data packets from the network disk client to the network block server through the IP network of FIG. 5 in accordance with the network block services protocol.

FIG. 8 shows a table of possible client opcodes in IP packets produced by the network block services layer (71 in FIG. 6) and transmitted from the network disk client (60 in FIG. 5) to the network block server (61 in FIG. 5). A READ opcode is used when the network disk client requests the network block server to read a specified length of data from a specified volume beginning at a specified offset. A WRITE opcode is used when the network disk client requests the network block server to write a specified length of data to a specified volume beginning at a specified offset.

An INFO opcode is used when the network disk client requests the network block server for a listing of the volumes for a specified key, or requests a report of the read capacity for a specified volume ID. For a VOLUME LIST request, the client specifies a KEY, and the server will then export the volumes to the client based on the specified KEY. For a READ CAPACITY request, the client specifies the VolID, and the server will then reply with the size of each block and the total number of blocks for the specified volume. The requests and replies, for example, are all in extended markup language (XML) format.

A "NO-OP" opcode is used when the network disk client sends a packet to the network block server to get a return packet to test or keep alive a TCP connection between the network disk client and the network block server.

The client opcodes, for example, have the following format:

| | |
|---|---|
| 0x0000 | READ |
| 0x0001 | WRITE |
| 0x0003 | INFO |
| 0x0004 | NO-OP |

Figure 9:
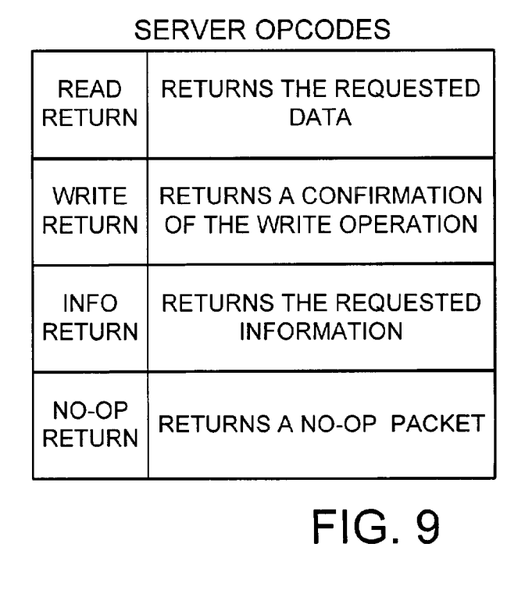
FIG. 9 is a table of server opcodes included in data packets returned by the network block server to the network disk client through the IP network in FIG. 5 in accordance with the network block services protocol.

FIG. 9 shows the server opcodes used in IP data packets returned by the network block server to the network disk client. A READ RETURN opcode is used when the network block server returns the data requested in a client's read request. The WRITE RETURN opcode is used when the network block server returns a confirmation of a write operation performed in response to a write request from the network disk client. The INFO RETURN opcode is used when the network block server returns information requested by the network disk client. The NO-OP RETURN opcode is used when the network block server returns a NO-OP packet in response to a NO-OP packet from the network disk client.

The server opcodes, for example, have the following format:

| | |
|---|---|
| 0x0040 | READ RESPONSE |
| 0x0041 | WRITE RESPONSE |
| 0x0043 | INFO RESPONSE |
| 0x0044 | NO-OP RESPONSE |

In the packet header (80 in FIG. 7), the "PduLen" field indicates the total length of packet header 80 and data 81. In INFO and NO-OP operations, the "PduLen" field is set to the length of the Packet Header. In a WRITE request operation or a READ reply, the "PduLen" field is set to the length of the Packet Header and Data Segments. In READ request operation or WRITE reply, the "PduLen" field is represented as the length of Packet Header.

In the packet header (80 in FIG. 7), the "Pid" field is a unique identifier of the packet. The "Pid" field is set by the client, and need not be touched by the server.

In the packet header (80 in FIG. 7), the "Status" field is zeroed out by the client, and the server sets up and returns status depending on the success of the requested operation. For example, the server returns an indication of whether or not the requested operation succeeds or fails.

In the packet header (80 in FIG. 7), the "Reserve1" and "Reserve2" fields are reserved for the future use.

In the packet header (80 in FIG. 7), the "VolID" field is sixteen-bytes containing a Volume Name.

In the packet header (80 in FIG. 7), the "Offset" field is the offset of the volume, and it is a count of a number of blocks in the logical volume. For example, each block consists of 8 K bytes. The Offset is only meaningful for READ and WRITE operations.

In the packet header (80 in FIG. 7), for a read request, the "DataLen" field specifies the number of bytes in a Data segment 81 following the packet header 80. For a read request, the "DataLen" field specifies the number of bytes to be read from the specified volume, starting at the Offset into the volume.

The IP packets for multiple block service requests may be sent to the server continuously. The server will service the requests on a first-come, first-served (FIFO) basis, but the server need not guarantee that the replies will all be in the same sequence as their respective requests.

For setting up a TCP connection between a network block client and a network block server, the client asks the server for the volume list using the key obtained via pre-configuration or authorization procedures. It then checks the capacity for each volume, and generates a pseudo-disk instance for each volume exported by the server. For example, a local pseudo-disk device named after/dev/nd* will be created. Each pseudo-disk instance can be used as a raw disk, or can be partitioned to multiple disk extensions. File systems and databases can be built on top of the raw or partitioned pseudo-disk instances. A client using the Linux™ operating system, for example, can mount simultaneously up to sixty-four local pseudo-disk instances, and have up to three partitions on each pseudo-disk instance.

Figure 10:
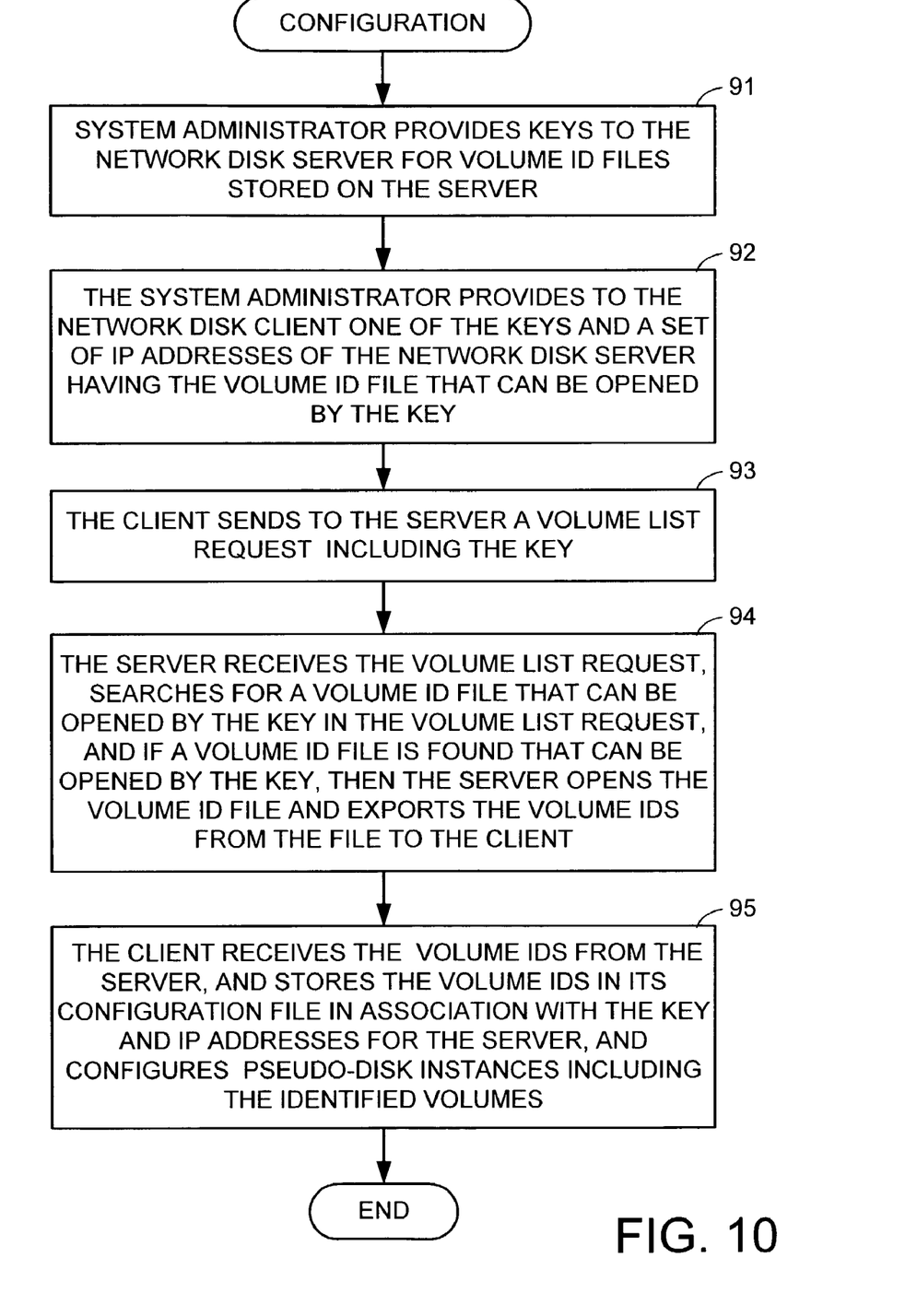
FIG. 10 is a flow chart of a configuration protocol used in the data processing system of FIG. 5 for exporting logical volumes of storage from the network block server to the network disk client.

FIG. 10, for example, shows a configuration routine for the data processing system of FIG. 5. In a first step 91, a system administrator (151 in FIG. 13) provides keys to the network disk server for respective volume ID files stored on the server. Next, in step 92, the system administrator provides to the network disk client one of the keys and a respective set of IP addresses of the network disk server having the volume ID file that can be opened by the key. Then in step 93 the client sends to the server a volume list request including the key. In step 94, the server receives the volume list request, searches for a volume ID file that can be opened by the key in the volume list request, and if a volume ID file is found that can be opened by the key, then the server opens the volume ID file and exports the volume IDs from the file to the client. Finally, in step 95, the client receives the volume IDs from the server, stores the volume IDs in its configuration file in association with the key and IP addresses for the server, and configures pseudo-disk instances including the identified volumes.

Figure 11:
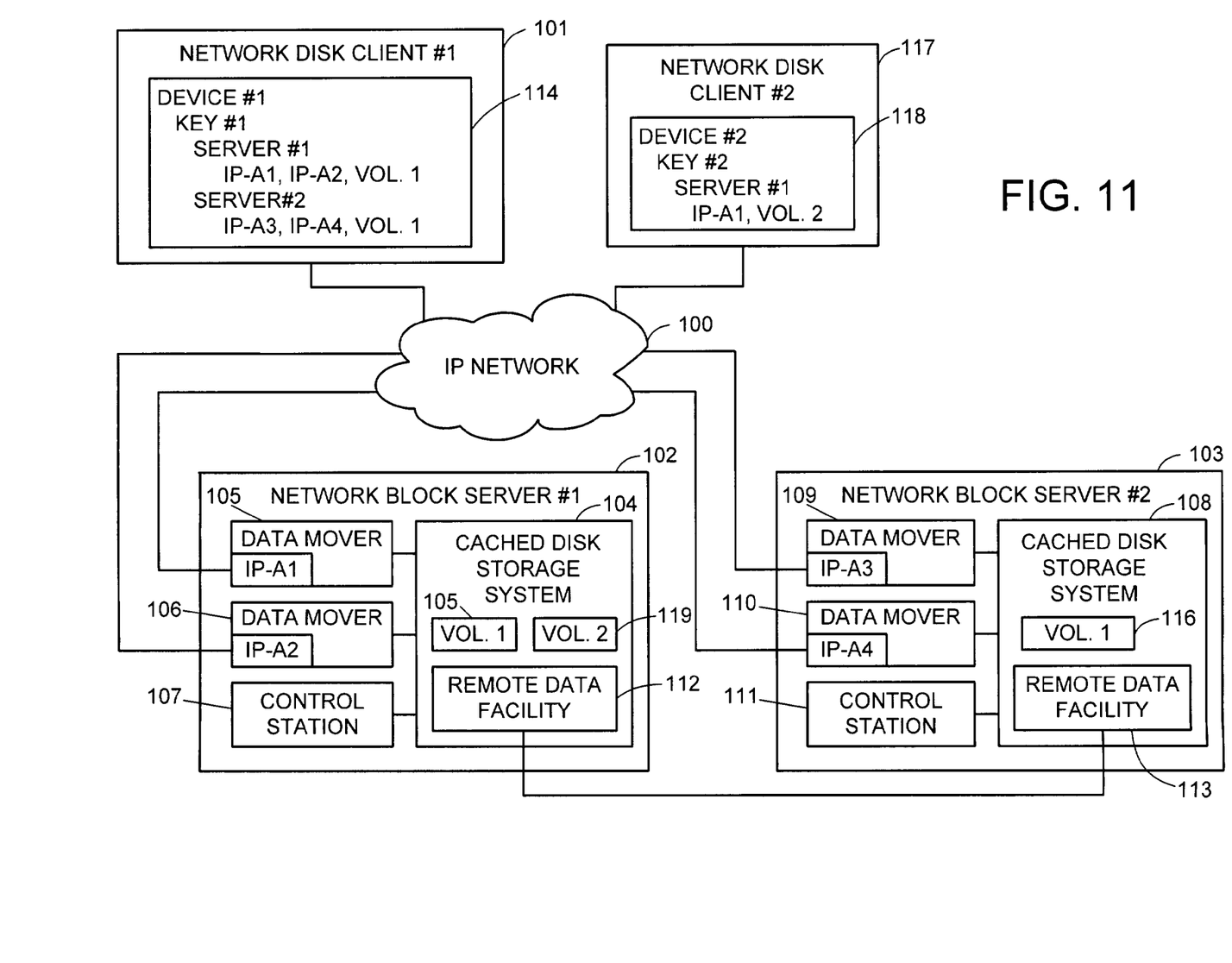
FIG. 11 shows an IP network including a network disk client and a pair of network block servers, in which each of the network block servers has a remote data facility for maintaining mirrored logical volumes for ensuring data availability.

FIG. 11 shows a specific example of a data processing system in accordance with a preferred implementation of the invention. In this system, an IP network 100 links a network disk client 101 to a first network block server 102 and a second network block server 103. The first network block server 102 includes a cached disk storage system 104 and a plurality of data movers 105, 106, each of which has a network link to the IP network 100 and is programmed to use the network block services protocol for exporting logical volumes of storage from the cached disk storage system 104 to the network disk client 101. The network block server 102 also has a control station 107 for initial configuration of the network block server 102. The cached disk storage system, data mover 105, 106, and control station 107 can be constructed as described in Tzelnic et al. U.S. Pat. No. 5,948,062 issued Sep. 7, 1999, incorporated herein by reference. The second network block server 103 is constructed in a fashion similar to the first network block server 102. The second network block server 103 has a cached disk storage system 108, a first data mover 109, a second mover 110, and a control station 111.

The first network block server 102 is linked to the second network block server 103 in order to provide automatic remote data mirroring of selected logical storage volumes in the network block servers. In particular, the cached disk storage system 104 in the first network block server 102 has a remote data facility 112 linked to a remote data facility 113 in the cached disk storage system 108 of the second network block server 103. The remote data facilities 112, 113 maintain synchronization between the mirrored logical storage volumes 115, 116 that are duplicated in the first network block server 102 and the second network block server 103. The remote data facilities 112, 113 can be constructed as described in Yanai et al. U.S. Pat. No. 5,743,792 issued Apr. 21, 1998 entitled "Remote Data Mirroring," incorporated herein by reference.

As indicated in a configuration file 114 in the network disk client 101, a local pseudo-disk instance (DEVICE #1) is associated with the duplicated logical volume 115, 116 (VOL. 1) that can be accessed by each data mover 105, 106 in the first network block server 102, or can be accessed by each data mover 109, 110 in the second network block server 103. Information about the logical volume (VOL. 1) for DEVICE #1 can be accessed using the same key (KEY #1) from IP addresses IP-A1 or IP-A2 in the first network block server 102, or from the network addresses IP-A3 or IP-A4 in the second network block server 103.

Also shown in FIG. 11 is a second network disk client 117. This second network disk client 117 has a configuration file 118 indicating that a pseudo-disk instance (DEVICE #2) has been configured having a key (KEY #2) and a volume (VOL. #2) accessible in the first network block server 102 (SERVER #1) from the server IP address (IP-A1) of the data mover 105.

In the data processing system of FIG. 11, each of the network block servers 102, 103 is initially configured by commands entered at its respective control station 107, 111. These commands include, for example, an "nbsid" command for configuring a specified logical volume for export to one or more clients, and an "exportnbs" command for exporting such a logical volume to a specified client.

The "nbsid" command has the following format:

nbsid add|delete|list nbsid=xxx vol=xxx[exclusive] [raw]

The "nbsid" becomes a network block server object ID assigned by the control station. Its data type is a 16 byte string. "vol" is the volume ID of storage in the server. "exclusive" is an optional specification that allows the network block server object to be accessed without a volume hierarchy restriction. "raw" is an optional specification that allows a raw volume access method.

The "exportnbs" command has the following format:

exportnbs add|delete|clean|list ip=xxx|cid=xxx nbsid=xxx attr=local|share

"ip" is the IP address of the client. "cid" is the ID of the client. "local" is a keyword to specify that the network block services object is used exclusively by the local client. "share" is a keyword to specify that the network block services object is shared by multiple clients Once the network block server has been configured in this fashion, a network block services program on each data mover can then be started by adding the following line to a boot.cfg file for the data mover:

nbs start

On the client side, the network block services layer (71 in FIG. 6) recognizes an "nd-cfg" command for volume device on the server. The "nd-cfg" command has the following format:

nd-cfg[-l][-I vid][-k key]-s server_name

"-l" lists all the volumes available to this client from the server. "-I vid" gets the capacity information for a specific volume. "-k key" provides the authentication key information. "-s server_name" provides the server name. The configuration information, for example, is returned in extended markup language (XML) format.

On the client side, the network block services layer (71 in FIG. 6) recognizes an "nd-geo" command for changing the geometry information of the network disk. The "nd-geo" command has the following format:

nd-geo -d devname -h heads—s sectors

"-d devname" provides the device name of the network disk, i.e. /dev/nda, etc. "-h heads" sets the heads for the device. "-s sectors" sets the sectors for the device.

On the client side, the network block services layer (71 in FIG. 6) recognizes an "nd-setup" command from the client operating system or system administrator in order to set up the device mapping. The "nd-setup" command has the following format:

nd-setup[-k key]-s server_name1, server name2, . . .

"-k key" provides the authentication key information. "-s server_name 1, server_name2, . . . " provides the server group information.

The "nd-setup" command is used to automate the network disk discovery and attachment. The "nd-setup" process gets the volume list from the server, and then assigns a device handle for each volume in the list. At last it calls an "nd-clnt" command to setup network disk connection. The "nd-clnt" command has the following format:

nd-clnt devno nbsId server_list . . .

"devno" is the device handler assigned to the volume. The network disk with device handle "0" is named after /dev/nda, etc. "nbsId" is the network block services device ID from the server. "server_list" is a server group for the communication.

The "nd-clnt" command sets up a fail-over network block server client daemon. A user can invoke the "nd-clnt" command when the user knows the volume information and wants to bypass the authentication. The client's network block services layer (71 in FIG. 6) responds to the command by checking the volume capacity first, and then creating an agent which forwards I/O requests to the remote network block server, and then finishes those I/O requests upon receiving the server reply.

Figure 12:
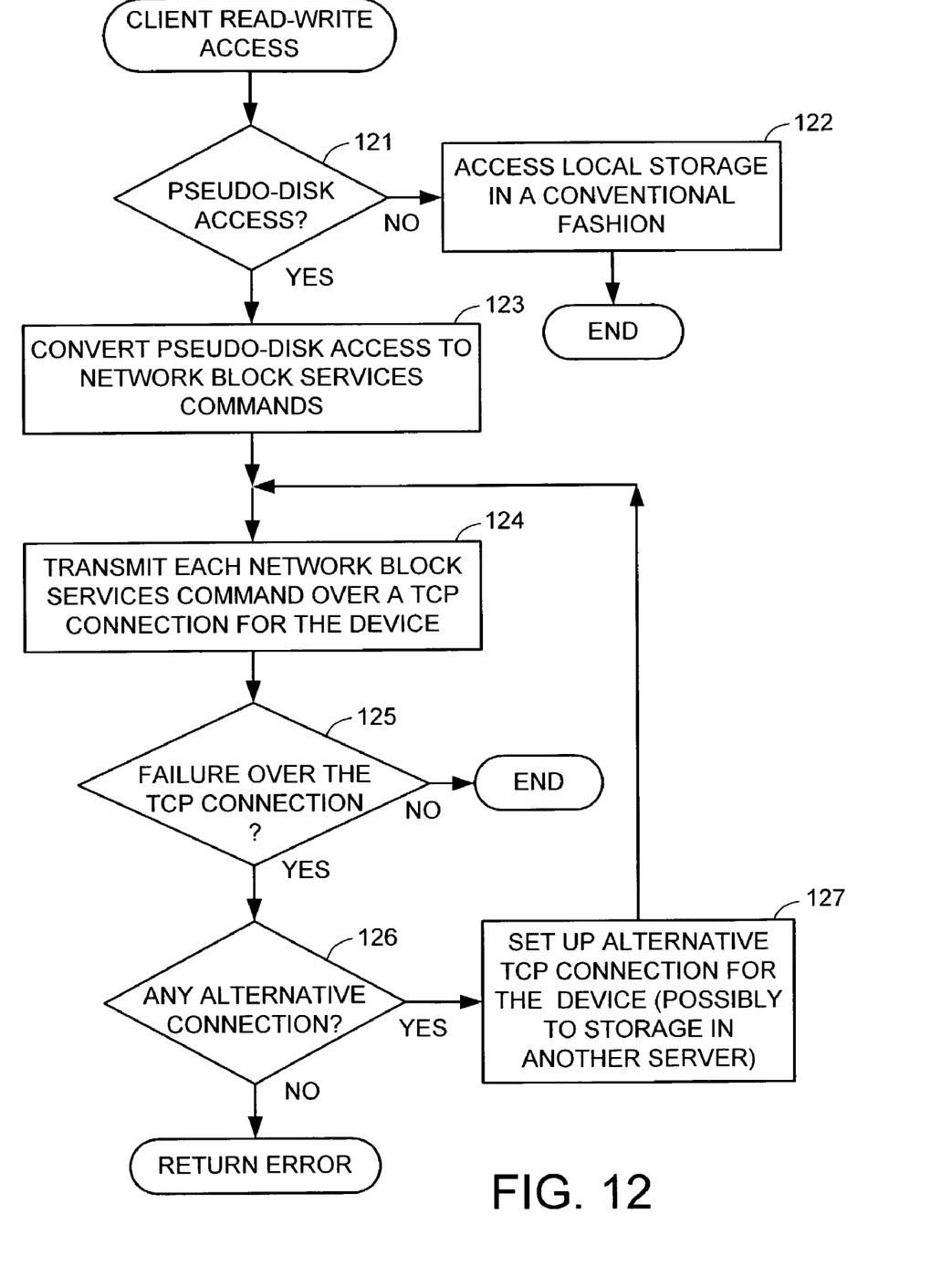
FIG. 12 is a flow chart showing the processing of read-write access by the network disk client to logical volumes in the network block servers of FIG. 11.

FIG. 12 shows a procedure for processing a client read-write access request in the data processing system of FIG. 11. In a first step 121 of FIG. 12, if the client is not accessing a pseudo-disk instance, then execution branches to step 122 to access local storage of the client in a conventional fashion. Otherwise, if the client is requesting access to a pseudo-disk instance, then execution continues from step 121 to step 123. In step 123, the pseudo-disk access request is converted to one or more network block services commands. In step 124, the client transmits each network block services command over a TCP connection for the device. For example, the client first tries to establish a TCP connection to the first IP address in the address list for the key for the pseudo disk to be accessed. If there is not a failure over this TCP connection, as tested in step 125, then the client read-write access is completed over this TCP connection. Otherwise, if there is a failure, then execution continues to step 126 to look for an alternative TCP connection to the logical volume for the pseudo-disk instance. If such an alternative TCP connection is available, then execution branches to step 127 to set up the alternative TCP connection.

Possibly, an alternative TCP connection is to storage in another network block server. For example, in the data processing system of FIG. 11, if there is an initial failure to a TCP connection between the network disk client 101 and the IP address IP-A1 for the first data mover 105 in the first network block server, then the network disk client will try to establish a TCP connection to the network address IP-A2 of the second data mover 106 of the first network block server 102. If a TCP connection cannot be established between the network disk client 101 and the network address IP-A2 of the second data mover 106 of the first network block server 102, then the network disk client will attempt to establish a TCP connection to the network address IP-A3 of the first data mover 109 in the second network block server 103. Once an alternative TCP connection for the device is set up, then execution loops back from step 127 to step 124 to continue transmission of network block service commands over the TCP connection for the device. If in step 126 there are no alternative connections to complete a client read-write access to a pseudo disk, then execution returns with an error.

As noted above, in response to each network block service command from a network disk client, the server only replies a "SUCCEED" or "FAIL" status. For example, once a block device driver in the client receives FAIL status returned from a server, receives a corrupted packet data returned from a server, or fails to receive a server response within a predefined timeout period, then the block device driver attempts to recover by connecting to the next server IP address in the IP address list for the pseudo-disk device. Moreover, the block device driver maintains a separate outstanding request queue (185 in FIG. 14) for each TCP connection, in order to reissue the outstanding requests during the recovery. For example, each request is kept in a send queue for the TCP connection until a proper response is received from a server (possibly after the TCP connection has been re-routed) or until the request is aborted (for example, when the TCP connection fails and an alternative TCP connection cannot be established).

Figure 13:
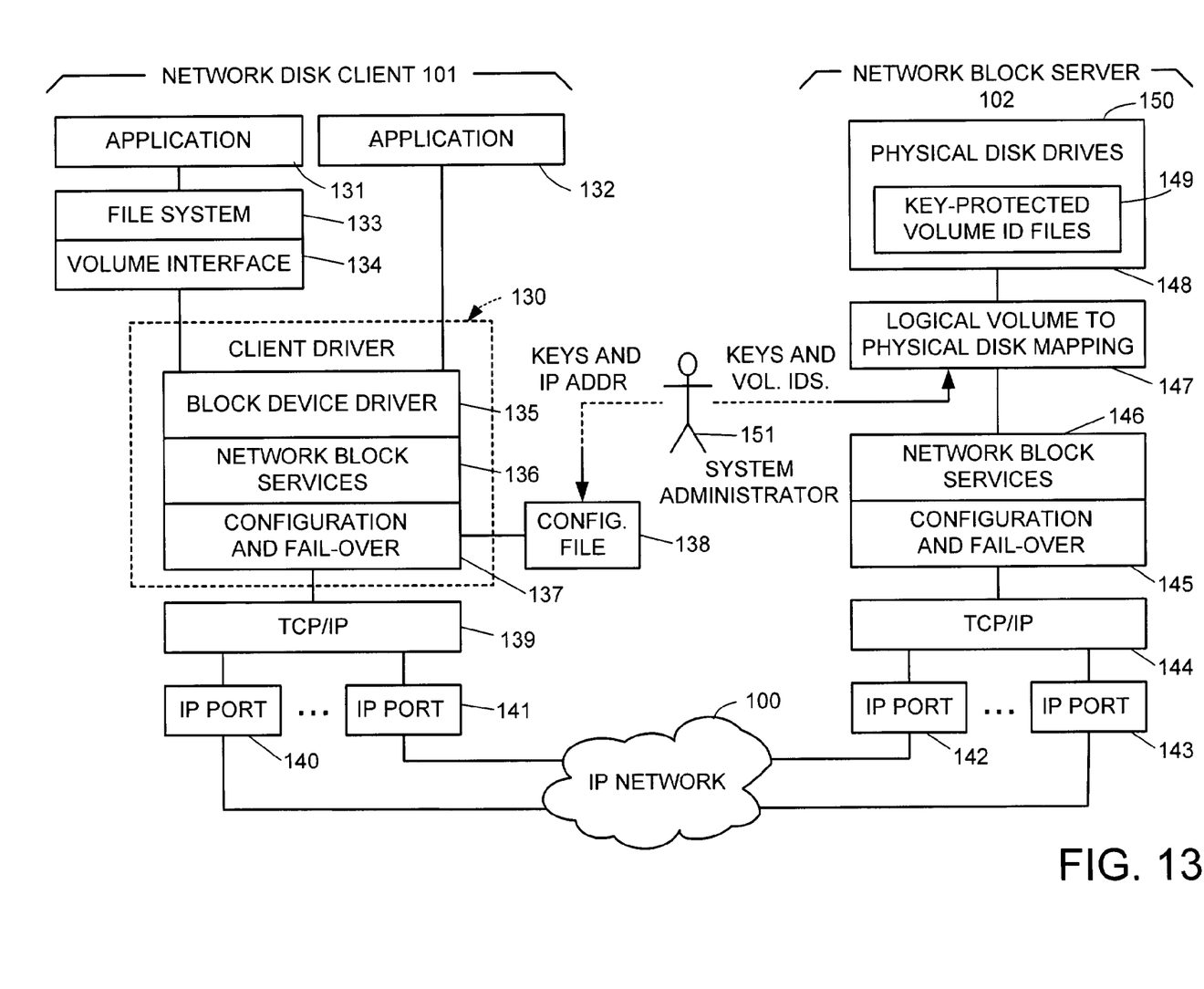
FIG. 13 shows a particular organization of functional blocks in the network disk client and one of the network block servers in the data processing system of FIG. 11.

FIG. 13 shows in greater detail functional blocks in the network disk client 101 and the network block server 102 in the system of FIG. 11. FIG. 13, for example, shows that the network disk client 101 may be programmed with a plurality of application programs 131, 132. The first application 131 accesses a file system 133 layered over a volume interface 134. The volume interface 134 accesses a pseudo-disk client driver 130. However, the second application 132 directly accesses the pseudo-disk client driver 130. For example, the second application 132 accesses "raw disk" and keeps track of the logical block addresses where data is to be read or written.

The pseudo-disk client driver 130 includes a block device driver 135 layered over a network block services layer 136, which is in turn layered over a configuration and fail-over routine 137. The configuration and fail-over routine 137 accesses a configuration file 138 in local storage of the network disk client 101. The pseudo-disk client driver 130 is layered over a TCP/IP layer 139. The TCP/IP layer 139 provides an interface between the pseudo-disk client driver 130 and a number of IP ports 140, 141 linked to the IP network 100.

The network block server 102 also has a number of IP ports 142, 143, linked to the IP network 100. A TCP/IP layer 144 interfaces the IP ports 142, 143 to a configuration and fail-over routine 145 which may re-direct return IP packets if there is failure of one of the IP ports 142, 143. A network block services layer 146 is layered over the configuration and fail-over routine 145. The TCP/IP layer 144, the configuration and fail-over routine 145, and the network block services layer 146 are programmed in each of the data movers (105, 106) of the network block server 102.

The cached disk storage system (104 in FIG. 11) of the network block server 102 is programmed to perform logical volume to physical disk mapping 147, which may map a number of physical disk drives 160 to each logical volume. In addition to storing data for pseudo disks of network clients, the physical disk drives 150 also store configuration information, including respective key-protected volume ID files 149 for the network disk clients. A system administrator 151 sets up the key-protected volume ID files 149 by entering each keys and corresponding list of logical volume IDs into the network block server at a user interface (not shown) provided by the control station (107 in FIG. 11) of the network block server 102. Then the system administrator 151 enters a respective key and corresponding list of IP addresses into the configuration file 138 of each network disk client 101.

Figure 14:
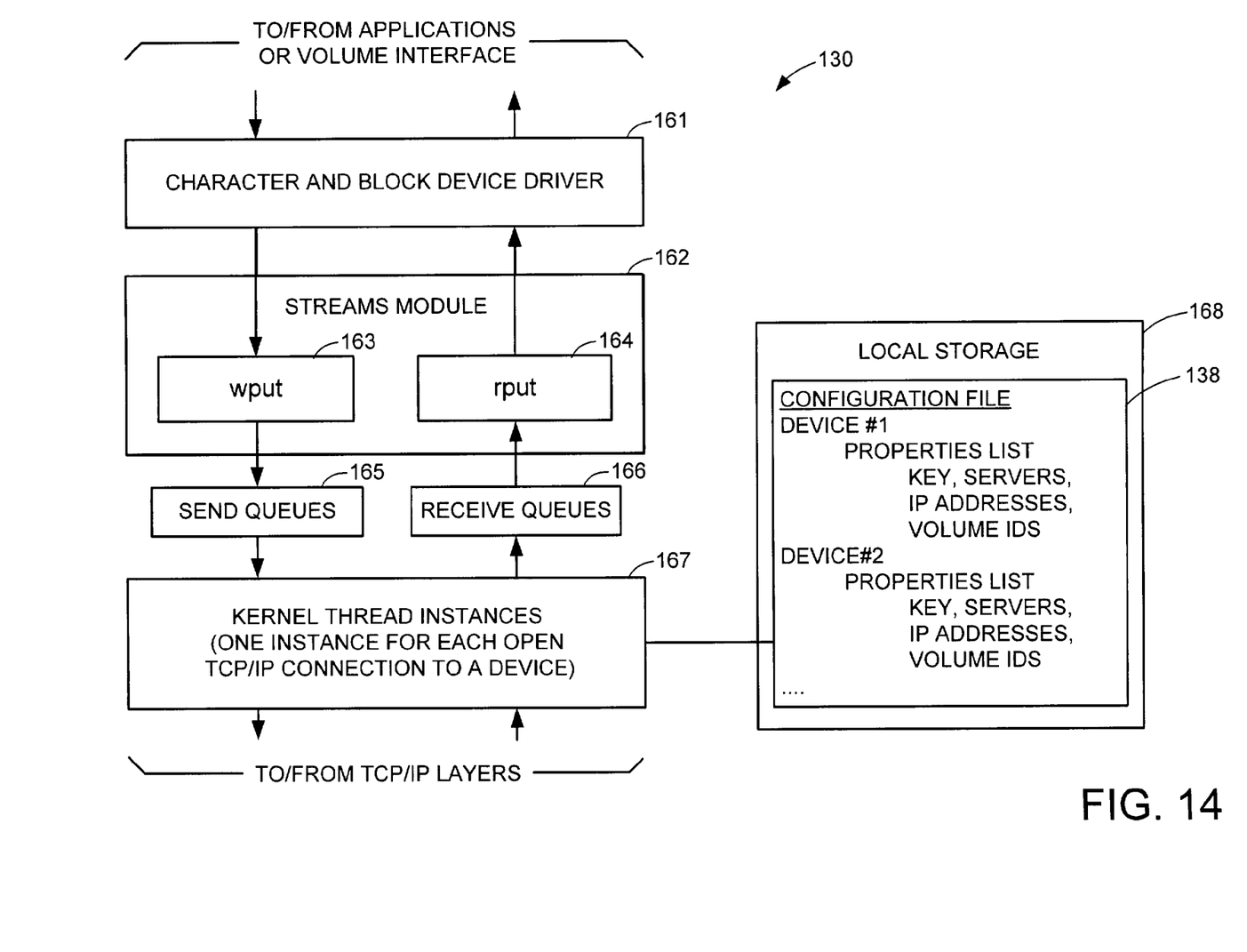
FIG. 14 shows a specific configuration for the client driver introduced in FIG. 13.

FIG. 14 shows a preferred construction for the client driver 130. The client driver 130 includes a character and block device driver 161, a streams module 163 including a write stream (wput) routine 163 and a read stream (rput) routine 164, send queues 165, receive queues 166, and kernel thread instances 167. There is one kernel thread instance for each open TCP/IP connection to a device. The client driver accesses the client's configuration file 138 in the client's local storage 169 to determine the possible server IP addresses at which network-attached storage for each of the client's pseudo-disk instances (e.g., DEVICE #1 or DEVICE #2) can be accessed.

In a preferred implementation, the client is programmed with a block device driver in accordance with the Solaris 8™ device driver architecture described, for example, in "Writing Device Drivers," Part No. 805-7378-10, February 2000, Sun Microsystems, Inc., 801 San Antonio Road, Palo Alto, Calif. 94303-4900. This document is available for free download from the Sun Microsystems, Inc., Internet site. For example, the block device driver can use much of the structure and code of existing Solaris 8 drivers (such as the lofi, ramdisk, and pcram drivers). However, the block device driver code is modified to interface with new code for the network block services layer (136 in FIG. 13) for handling the network block services protocol, and new code for the configuration and fail-over layer (137 in FIG. 13) for establishing and maintaining TCP connections to the servers storing the respective logical volumes for the pseudo disk devices.

In the preferred implementation, the character and block device driver 161 present the Solaris™ standard interfaces to user applications and file systems. The streams module 162 is pushed onto the TCP/IP connection specifically to collect and handle responses from the server. The kernel thread monitors the health of the TCP/IP connection to the server, performing re-connects and re-transmissions as error situations arise.

Installation of the Solaris™ compliant pseudo-disk device driver 130 is performed by an _init routine, and removal of the pseudo-disk device driver is performed by an _fini routine. The _init routine installs both the character/block device driver as well as the streams module used by it. The unit of soft state storage is defined as a struct nddevice which will be allocated for each instance of the driver attached. The _fini routine removes both modules and frees the soft state information.

Autoconfiguration of the pseudo-disk device driver is performed by nd_attach, nd_detach routines, and configuration status is provided by the nd_info routine. The nd_probe routine need not be implemented, and instead, calls to nd_probe can be redirected to the nulldev routine. The nd_identify routine also need not be implemented, and instead, calls to nd_identify can also be redirected to the nulldev routine.

At driver installation time (usually after a reboot or execution of the add_drv nd command) an nd_attach routine is called for each instance of the driver defined in the nd.conf file. The nd_attach routine allocates a soft state struct nddevice for each instance and creates both block and raw (character) device nodes for the instance. Each instance of the driver corresponds to a single device with the minor number of the device equal to the instance number.

The nd_attach routine handles only the DDI_ATTACH command and will fail only if the soft state cannot be allocated or the creation of the minor nodes fail (usually a memory exhaustion problem as well). Once the soft state memory has been allocated, it is made consistent by initializing the queues, locks, and semaphores.

The nd_detach routine deallocates the soft state memory, freeing any copies of the ipaddr property attached. The nd_detach should only fail if called for a non-existent node, i.e. "can't happen'".

The nd_info routine implements only the DDI_INFO_DEVT2DEVINFO and DDI_INFO_DEVT2INSTANCE commands. If called with the DDI_INFO_DEVT2DEVINFO command, it retrieves the pointer to the dev_info node that was stored in the soft state at attach time. Since there is a one-to-one correspondence between minor devices and instances, the result returned by the DDI_INFO_DEVT2INSTANCE command is simply the instance number.

When first loaded, the pseudo-disk driver, nd, configures a minor node for each instance defined in the nd.conf file. Only those instances can be configured and connected, so a number of spare or dummy instances should be included in the configuration file. At configuration time, no error checking is performed to verify correctness, consistency or uniqueness of any of the configuration information.

The pseudo-disk driver, nd, uses an IP address list and Volume ID string to connect to a server having the storage for an instance of the nd driver. The IP address list and Volume ID string are extracted from the device properties list, which is, in turn, initialized from the nd.conf file.

The IP addresses are supplied as an array of 4-byte integers in network (most-significant-byte-first) order. The property name is "ipaddr." The Volume ID is a character string of 16 bytes or fewer and the property name of the Volume ID is "vid."

The configuration properties (IP address list and Volume ID string) for a given instance of the driver can be changed dynamically by opening the device with O_NDELAY and O_EXCL flags set and then issuing the appropriate ioctl calls to the driver, which are further described below.

Each instance of the nd driver is associated with a single minor number and with a single piece of storage on a network block server. When viewed as a block device, there is but one slice or partition on the device subsuming the entire space of the device.

Each instance of the nd driver has the following common entry points: nd_open, nd_close, nd_prop_op, nd_strategy, nd_print, nd_dump, nd_dump, nd_read, nd_write, nd_ioctl, nd_devmap, nd_mmap, nd_segmap, and nd_poll. A nd_prop_op routine need not be implemented, and instead, calls to this entry point may be re-directed to the routine ddi_prop_op. Routines for the entry points nd_dump, nd_devmap, nd_mmap, nd_segmap need not be implemented, and instead, calls to these entry points may be re-directed to the routine nodev. An nd_poll routine need not be implemented, and instead, calls to this entry point may be re-directed to the routine nochpoll.

If a call to nd_open opens the device with O_NDELAY and O_EXCL the expectation is that the application intends to pass configuration information by way of a subsequent ioctl call. This type of open succeeds immediately or will fail if the device is already open. The driver enforces the O_EXCL in all cases, returning EBUSY if already open. All other opens will succeed if the driver is already open and configured. If not already open, the configuration will be read from the device properties list and the monitor thread kicked off to establish a connection. Failure to read the properties or to establish a connection cause the open to fail. Opens and closes are serialized by using a semaphore, nd_ocsema, associated with each minor device.

The last close of the device causes the stream connection to the server, if connected, to be severed. This shuts down the monitor thread.

The strategy routine, nd_strategy, takes the passed buffer header, checks that the I/O request is within bounds and queues the buffer on the device's send queue. Once on the queue a packet is formatted, based on the buffer header, and sent to the network block server. The responses are handled by the ndstr streams module.

The nd_print routines calls cmn_err to print the minor number of the passed dev_t and the passed string.

The nd_read routine does bounds checking and I/O offset alignment checking and then uses physio to format a buffer and pass it to the nd_strategy routine.

The nd_write routine does bounds checking and I/O offset alignment checking and then uses physio to format a buffer and pass it to the nd_strategy routine.

The nd_ioctl routine supports two distinct types of ioctl commands. The first set is supported on any open and configured device. These commands are used to support newfs (1m) et al, and include DKIOCEJECT (returns ENOSYS), DKIOCGVTOC (returns a struct vtoc generated by the driver), DKIOCGGEOM (returns a struct dk_geom generated by the driver), DKIOCINFO (returns a struct dk_cinfo generated by the driver), DKIOCREMOVABLE (returns a 0, i.e. not removable), and DKIOCSTATE (returns DKIO_INSERTED).

The second set is a configuration command: ND_CONFIG. This is only used when the driver has been opened with both O_NDELAY and O_EXCL set. This command passes a variable length data structure consisting of a character array of 16 bytes and an array of integers. The byte array is treated as a string and is assigned to the device property vid. The array of ints is assigned to the property ipaddr. No command is provided to read the configuration information which can be readily had by prtconf(1m) or through the devinfo(7) device.

The monitor thread is a kernel-level thread that runs for each open nd device. At open time the monitor attempts to establish a connection to the NBS server using the list of IP addresses configured for that device. The IP addresses are tried in the order supplied (either by the nd.conf file or in the ND_CONFIG ioctl command).

Once the connection is established, the ndstr streams module is pushed. If this is the first connection made, an INFO request is sent to the server and the response parsed to generate bounds, vtoc, and dk_geom information. Then the monitor thread settles back looking for error conditions to arise.

If the connection is terminated, then the thread aborts. If the connection fails, then the monitor tears down the current connection and attempts to re-establish a connection starting with the first of the supplied addresses. If successful, the outstanding I/O requests (on the nd_sntq) are resent. If unsuccessful, they are failed.

Once a connection is established by the monitor thread, a streams module, ndstr, is pushed onto the TCP/IP stack to facilitate handling of the data stream. There are two sides to this module. One is the ndstr_wput routine which handles outgoing requests, i.e. to the server. And the other is the ndstr_rput routine which handles responses, i.e. from the server.

The ndstrwput routine calls the nd_strategy routine for the actual generation of requests (nd packets); therefore, ordinary data requests are simply passed through to the underlying transport stream. There are three M_IOCTL messages supported by the streams module and implemented by ndstr_wput. The NDSTR_SETNDP ioctl passes the pointer to the struct nddevice to the stream. This is used primarily by the ndstr_rput routine. The other M_IOCTL messages cause the connection to be terminated and restarted or aborted.

The ndstr_rput routine passes through all non-data messages to be handled by the monitor stream. The ndstr_rput routine parses the received data stream into packets, finds the associated buffer on the nd_sntq, and completes the request based on the response from the server. This division of labor frees the monitor thread to manage the connection.

In Solaris, messages can be assigned priorities that can move them ahead of other messages in the stream. Therefore, there are circumstances where a performance improvement may be obtained by making short requests (i.e. reads) a higher priority by moving them ahead of the longer write requests. Of course, this cannot be done if the requests specify operations that need to be serialized for consistency purposes, for example, if the data to be read is the new data to be written.

In view of the above, there has been described a network block services protocol for reducing the IP network bottleneck to network-attached block storage. In a preferred implementation, the SCSI and iSCSI layers over the TCP/IP layers of the protocol stack in an IP network client and in an IP network-attached storage server are replaced with a thin network block services layer. The network block services layer 71 implements a network block services protocol having a very reduced set of commands transmitted between the client and the storage server. The network block services protocol is used in a configuration process in which logical volumes of the network-attached storage are exported to the client and become local pseudo-disk instances. The client's operating system and application programs access the local pseudo-disk instances with what appears to be a standard device driver for a local disk device. The device driver maintains a TCP connection to each open device, and responds to connection failure by re-connecting with an alternative server IP port.

Although specific embodiments of the invention have been described above with respect to the drawings, it should be apparent that the embodiments can be modified in various ways without departing from the scope of the appended claims. For example, the distribution of a key to a client and a server has been shown as a mechanism for associating a client with logical volumes of storage on the server and also authenticating the client's requests. Instead of using a key, the client's list of logical volumes of storage could be associated with a client's IP address or another kind of client identifier. In a secure network, such as a local area network, it may not be necessary to authenticate the client's requests. Moreover, the client's requests can be authenticated in various ways other than key distribution, such as the user-ID and group-ID (uid/gid) authentication method of UNIX-based systems, or another kind of SCSI compatible security mechanism, which could be added as plug-in.

What is claimed is:

1. A data processing system comprising:
    a client, a storage server, and an Internet Protocol (IP) network linking the client to the storage server for client access to storage in the storage server, the storage including storage units allocated to the client, the storage server containing an identification of the storage units allocated to the client, the client and the storage server each being programmed with a protocol stack, each protocol stack including a network block services layer over an IP layer, the network block services layer encoding and decoding IP packets transmitted over the IP network between the client and the server in accordance with a network block services protocol, the IP packets transmitted over the IP network between the client and the server in accordance with the network block services protocol including IP packets for requesting the identification of the storage units allocated to the client, IP packets for reading data from the storage units allocated to the client, and IP packets for writing data to the storage units allocated to the client, the client being programmed for configuring the identified storage units allocated to the client into pseudo-disk instances after obtaining from the storage server the identification of the storage units allocated to the client by invoking the network block services layer to request from the storage server the identification of the storage units allocated to the client, and the client being further programmed with a block interface for enabling an operating system or application program of the client to access the pseudo-disk instances by invoking the network block services layer to read data from the storage units allocated to the client and for writing data to the storage units allocated to the client,
    wherein the client is programmed with a list of storage server IP addresses, and wherein the protocol stack of the client includes a configuration and fail-over layer between the network block services layer and the IP layer, the configuration and fail-over layer responding to a failure to communicate with a storage server IP address in the list of storage server IP addresses by re-establishing communication with an alternative storage server IP address in the list of storage server IP addresses.

2. The data processing system as claimed in claim 1, wherein the configuration and fail-over layer maintains a respective Transmission Control Protocol (TCP) connection between the client and the storage server for each of the pseudo-disk instances.

3. The data processing system as claimed in claim 1, wherein the data processing system includes a plurality of storage servers including a first storage server and a second storage server linked to the first storage server by a remote data facility for maintaining a duplicate copy of a storage unit in storage of the first storage server and in storage of the second storage server, and wherein the client is programmed with a respective list of storage server IP addresses for each pseudo-disk instance, and wherein the respective list of storage server IP addresses for at least one of the pseudo-disk instances includes an IP address for the first storage server and an IP address for the second storage server.

4. The data processing system as claimed in claim 1
    wherein the storage server contains lists of storage unit identifiers and a respective key protecting each list, and wherein each list is accessible over the IP network only when said respective key protecting said each list is included in a request for identification of storage units in the storage server.

5. A client for accessing a storage server in an Internet Protocol (IP) network, the storage server containing storage units allocated to the client, the storage server also containing an identification of the storage units allocated to the client, said client comprising:
    at least one IP port for transmitting and receiving IP packets over the IP network between the client and the server, wherein the client is programmed for encoding and decoding the IP packets transmitted over the IP network between the client and the server in accordance with a network block services protocol, the IP packets transmitted over the IP network between the client and the server in accordance with the network block services protocol including IP packets for requesting identification of the storage units allocated to the client, IP packets for reading data from the storage units allocated to the client, and IP packets for writing data to the storage units allocated to the client, the client being programmed for using the network block services protocol for obtaining the identification of the storage units allocated to the client, the client being programmed for configuring the storage units allocated to the client into local pseudo-disk instances, the client maintaining a list of storage server IP addresses for each of the local pseudo-disk instances, and the client being further programmed with a device driver for accessing each local pseudo-disk instances by establishing and maintaining a Transmission Control Protocol (TCP) connection to at least one storage server IP address in the list of storage server IP addresses for said each local pseudo-disk instance, wherein the client is programmed with a protocol stack including a block interface layer of the device driver for interfacing with an operating system or application program of the client, a network block services layer of the device driver for managing the network block services protocol, a configuration and fail-over layer of the device driver for establishing and maintaining a TCP connection to at least one server IP address in each list, a TCP layer for managing the Transmission Control Protocol, and an IP layer for managing the Internet Protocol over the IP network, the configuration and fail-over layer being between the network block services layer and the IP layer and programmed for responding to a failure to communicate with a storage server IP address in said each list by re-establishing communication with an alternative storage server IP address in said each list.

6. A client having at least one IP port for accessing network-attached storage allocated to the client in an Internet Protocol (IP) network, the client comprising a client driver, the client driver including:

configuration file means for storing, in local storage of the client, configuration information defining pseudo-disk instances configured from the network-attached storage allocated to the client and identifying server IP addresses at which the network-attached storage of the pseudo-disk instances may be accessed;

network block services means for encoding and decoding IP packets transmitted over the IP network between the client and the network-attached storage in accordance with a network block services protocol, the IP packets transmitted over the IP network between the client and the network-attached storage in accordance with the network block services protocol including IP packets for requesting identification of the network-attached storage allocated to the client, IP packets for reading data from the network-attached storage allocated to the client, and IP packets for writing data to the network-attached storage allocated to the client;

configuration and fail-over means coupled between the network block services means and the IP port and accessing the configuration file for using the network block services means for discovering the network-attached storage allocated to the client and configuring the pseudo disk instances from the network-attached storage allocated to the client, for responding to a failure to communicate with a storage server IP address in said configuration information in said local storage of said client by re-establishing communication with an alternative storage server IP address in said configuration information in said local storage of said client, and for establishing and maintaining a Transmission Control Protocol (TCP) connection for an open pseudo-disk instance to at least one storage server IP address at which network-attached storage of the open pseudo-disk instance may be accessed; and block device driver means coupled to the network block services means and the configuration and fail-over means for presenting a disk driver interface to client programs for access to the pseudo-disk instances.

7. The client as claimed in claim 6, wherein each IP packet transmitted over the IP network between the client and the network-attached storage in accordance with the network block services protocol includes a packet header having an opcode field, a packet data unit length field, a packet identifier field, a status field, a storage unit identifier field, an offset field, and a data length field.

* * * * *